United States Patent Office 3,559,472
Patented Feb. 2, 1971

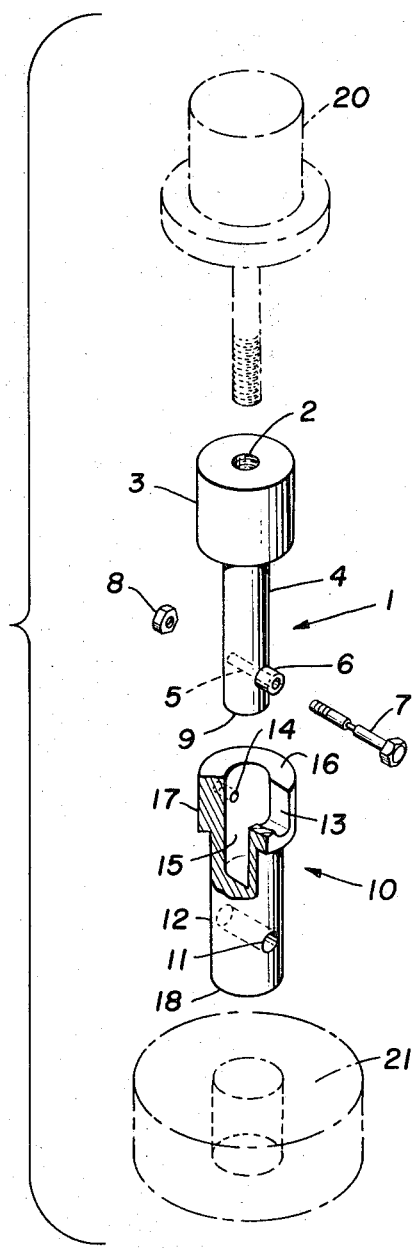

3,559,472
DEVICE FOR TESTING SHEAR PINS
Byrd T. Thompson, Jr., Decatur, Ala., assignor to Monsanto Company, St. Louis, Mo., a corporation of Delaware
Filed Dec. 30, 1968, Ser. No. 787,918
Int. Cl. G01n 3/24
U.S. Cl. 73—101                2 Claims

ABSTRACT OF THE DISCLOSURE

A device for testing shear pins comprising a rod having a transverse opening near one end thereof, and a receiving member having a radial slot, a transverse opening, and a longitudinal opening in one end thereof; said longitudinal opening being adapted to receive the rod.

BACKGROUND OF THE INVENTION

(1) Field of the invention

This invention relates generally to the testing of shear pins, and more specifically to a device for carrying out such testing.

(2) Description of the prior art

Shear pins have been used in many ways for some time, and have provided a margin of safety at a minimum of cost. The problems encountered in their use have not revolved around any application thereof, but around their characteristics and quality. Size and shape requirements and available materials are factors all of which may not be known at a particular time. Often when shear strength and size are specified, available materials dictate variance therefrom. Therefore, the only sure way of determining the characteristics of shear pins is to test same prior to use.

The results of using pins having too great a shear strength can be overload and/or damage, whereas the re-results of using a pin having too little shear strength can be repeated and costly replacement.

There are a number of ways as well as machines for determining the shear strength of a pin, but in general these are time-consuming and expensive. At present, there are no known devices which are simple and inexpensive and which can easily be incorporated into existing test equipment.

SUMMARY OF THE INVENTION

The problems set out above are overcome by testing shear pins through the use of a device comprised of a rod having a transverse opening in one end, and a receiving member having a radial slot, a transverse opening, and a longitudinal opening in one end thereof; the longitudinal opening receiving the rod.

It is therefore an object of this invention to provide a simple and inexpensive device for testing shear pins.

Another object of this invention is to provide a device which may be incorporated into existing apparatus.

These and other objects and advantages will become more readily apparent when read in conjunction with the remainder of the specification and considered along with the accompanying drawing.

BRIEF DESCRIPTION OF THE DRAWING

The drawing shows an exploded perspective view, partially broken away, of a preferred embodiment of a device according to this invention, along with associated parts of a readily available testing apparatus.

DESCRIPTION OF THE PREFERRED EMBODIMENTS

Referring to the drawing, there is shown a device for testing shear pins comprised of a retracting member and receiving member generally denoted by reference numerals 1 and 10, respectively. Retracting member 1 is made up of a rod 4 having on one end thereof an enlarged portion 3 which along with threaded opening 2 serves as an adapter for securing member 1 to an existing piece of equipment 20. On the other end 9 of rod 4 is a transverse opening 5 extending through guide pin 6.

Receiving member 10 is made up of a sleeve 12 having a transverse opening 11 in end 18 which serves as an adapter for existing member 21. On the other end 16 is enlarged portion 17 having a longitudinal opening 15 extending for a distance from end 16. Enlarged portion 17 has a U-shaped radial slot 13 opening into end 16, and a transverse opening 14 communicating with and opposite slot 13.

In operation end 9 of member 1 is fitted into longitudinal opening 15 in member 10 which is adapted to receive same in such a manner that guide pin 6 aligns communicating openings 5 and 14 and rests against the bottom of the U-shaped radial slot 13. Thereafter, shear pin 7 is inserted into guide pin 6, through transverse openings 5 and 14, whereupon nut 8 can be tightened. Assuming member 1 and 10 are secured to parts 20 and 21, the shear strength of pin 7 can be determined by applying opposite forces to members 1 and 10 and reading the tensile strength, or other, dial associated with parts 20 and 21.

The term "shear pin" is herein meant to include pins, rods, bolts, and similar items of uniform or varying diameter which are used to prevent overload and/or damage to equipment.

The existing equipment referred to herein can be any commercially available machine for determining tensile strength. Members 20 and 21, as well as the adapters on the ends of members 1 and 10, are presented for purposes of illustration only; changing structurally with different machines.

The foregoing illustrates the essential features of the invention. Various changes and modifications can be made in practicing the invention without departing from the sprit and scope thereof, and therefore, the invention should not be limited except as defined in the appended claims.

What is claimed is:
1. A device for testing shear pins comprising:
   (a) a retracting member being a rod having a transverse opening near one end and an adapter connected to the other end; and
   (b) a receiving member being a sleeve having an adapter connected to one end, a longitudinal opening in the other end adapted to receive the end of the rod having an opening, a radial slot in the sleeve communicating with the longitudinal opening, and a transverse opening in the sleeve axially aligned with the slot and adapted to communicate with the transverse opening in the rod.
2. A device according to claim 1 wherein a guide pin is secured to the end of the rod having a transverse opening for aligning the opening in the rod with the transverse opening in the sleeve.

References Cited
UNITED STATES PATENTS
2,191,348   2/1940   Lauterbach ---------- 287—96
2,437,750   3/1948   Mann --------------- 73—101

JERRY W. MYRACLE, Primary Examiner